United States Patent
Werling

(10) Patent No.: US 9,315,091 B1
(45) Date of Patent: Apr. 19, 2016

(54) SYSTEM AND METHOD OF ASSEMBLING A VEHICLE BODY GARNISH

(71) Applicant: Honda Motor Co., Ltd., Tokyo (JP)

(72) Inventor: John E. Werling, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/533,159

(22) Filed: Nov. 5, 2014

(51) Int. Cl.
*B60J 5/10* (2006.01)
*B60R 13/04* (2006.01)
*B62D 65/06* (2006.01)
*B23K 31/02* (2006.01)
*B60J 5/04* (2006.01)

(52) U.S. Cl.
CPC .................. *B60J 5/107* (2013.01); *B23K 31/02* (2013.01); *B60R 13/04* (2013.01); *B60J 5/0463* (2013.01); *B62D 65/06* (2013.01)

(58) Field of Classification Search
CPC ............ B60J 5/0463; B60J 5/10; B60J 5/107; B60R 13/04; B62D 25/10; B62D 25/105; B62D 25/16; B62D 65/02; B62D 65/06
USPC ............. 296/50, 56, 146.5, 146.6, 146.8, 198
See application file for complete search history.

(56) References Cited

U.S. PATENT DOCUMENTS

| | | | |
|---|---|---|---|
| 5,449,213 A * | 9/1995 | Kiley | B60J 5/107 296/146.5 |
| 5,741,044 A | 4/1998 | Kawai et al. | |
| 5,791,716 A | 8/1998 | Takagi et al. | |
| 5,836,641 A | 11/1998 | Sugamoto et al. | |
| 6,241,307 B1 * | 6/2001 | Kim | B60J 5/101 296/106 |
| 6,508,035 B1 * | 1/2003 | Seksaria | B60J 5/0425 296/146.5 |
| 6,776,449 B2 * | 8/2004 | Komatsu | B60J 5/0405 296/146.5 |
| 8,226,151 B2 * | 7/2012 | Miyake | B60J 5/101 296/106 |
| 8,915,532 B2 * | 12/2014 | Iwano | B62D 25/105 296/146.5 |
| 2002/0195844 A1 | 12/2002 | Hipwell | |
| 2004/0055131 A1 * | 3/2004 | Ghuman | B23K 37/0426 29/429 |
| 2011/0179719 A1 | 7/2011 | Matsumoto et al. | |

FOREIGN PATENT DOCUMENTS

| | | |
|---|---|---|
| JP | 2004338522 | 12/2004 |
| JP | 2005319939 | 11/2005 |

* cited by examiner

*Primary Examiner* — Jason S Daniels

(74) *Attorney, Agent, or Firm* — Rankin, Hill & Clark LLP

(57) ABSTRACT

A vehicle assembly comprises a structural component that defines a portion of a vehicle body and a garnish member. The structural component is formed of a first metal. The garnish member is formed of the first metal and is fixedly attached via welding or hemming directly to the structural component in a same welding station of a vehicle assembly line as the assembly of the structural component. The garnish member includes a body having an outer surface which defines an exterior surface of the vehicle body.

20 Claims, 4 Drawing Sheets

SYSTEM AND METHOD OF ASSEMBLING A VEHICLE BODY GARNISH

BACKGROUND

In the manufacture or assembly of a vehicle body, it is known to have a vehicle body assembly line including a plurality of designated work stations in which the vehicle body is assembled and forwarded as the assembly work proceeds. Typically, the major structural components of the vehicle body are welded together in a general welder (i.e., one of the stations of the assembly line wherein primary welding operations are performed to connect the vehicle body components to create the body-in-white body). The vehicle body is then transferred to a painting station for the start of the painting process.

Current vehicle body designs use plastic garnishes or bolted on parts to cover certain portions of the assembled vehicle body that cannot meet styling or design requirements. Generally, these plastic garnishes are attached through metal brackets that are affixed (via welding or fasteners) to the vehicle body. Plastic garnishes have a higher cost and usually do not offer structural reinforcement to that portion of the vehicle body. In addition, bolted on parts require additional manpower which can lead to inconsistent fit of the garnish on the vehicle body portion.

BRIEF DESCRIPTION

In accordance with one aspect, a vehicle assembly comprises a structural component that defines a portion of a vehicle body and a garnish member. The structural component is formed of a first metal. The garnish member is formed of the first metal and is fixedly attached directly via welding or hemming to the structural component in a same welding station of a vehicle assembly line as the assembly of the structural component. The garnish member includes a body having an outer surface which defines an exterior surface of the vehicle body.

In accordance with another aspect, a system for assembling a vehicle body comprises a vehicle assembly line having a plurality of stations including a welding station and a paint station located downstream of the welding station. The welding station is adapted to receive and weld a structural component that defines a body component of a vehicle body. The structural component is formed of a first metal. The welding station is further adapted to receive a garnish member formed of the first metal and weld the garnish member directly to the structural component. The garnish member defines an exterior surface of the vehicle body. The painting station is adapted to receive and paint the structural component and the garnish member welded thereto.

In accordance with yet another aspect, a method of assembling a vehicle body comprises assembling a vehicle body structural component formed of a first metal in a vehicle assembly line; transferring the assembled structural component to a welding station of the vehicle assembly line; providing a garnish member formed of the first metal, the garnish member defines an exterior surface of the vehicle body, and transferring the garnish member to the welding station; setting the garnish member in position relative to the structural component in the welding station; and welding the garnish member directly to the structural component.

DETAILED DESCRIPTION

It should, of course, be understood that the description and drawings herein are merely illustrative and that various modifications and changes can be made in the structures disclosed without departing from the present disclosure. It will be appreciated that the various identified components of the exemplary system/method for assembling a vehicle body disclosed herein are merely terms of art that may vary from one manufacturer to another and should not be deemed to limit the present disclosure.

Figure 1:
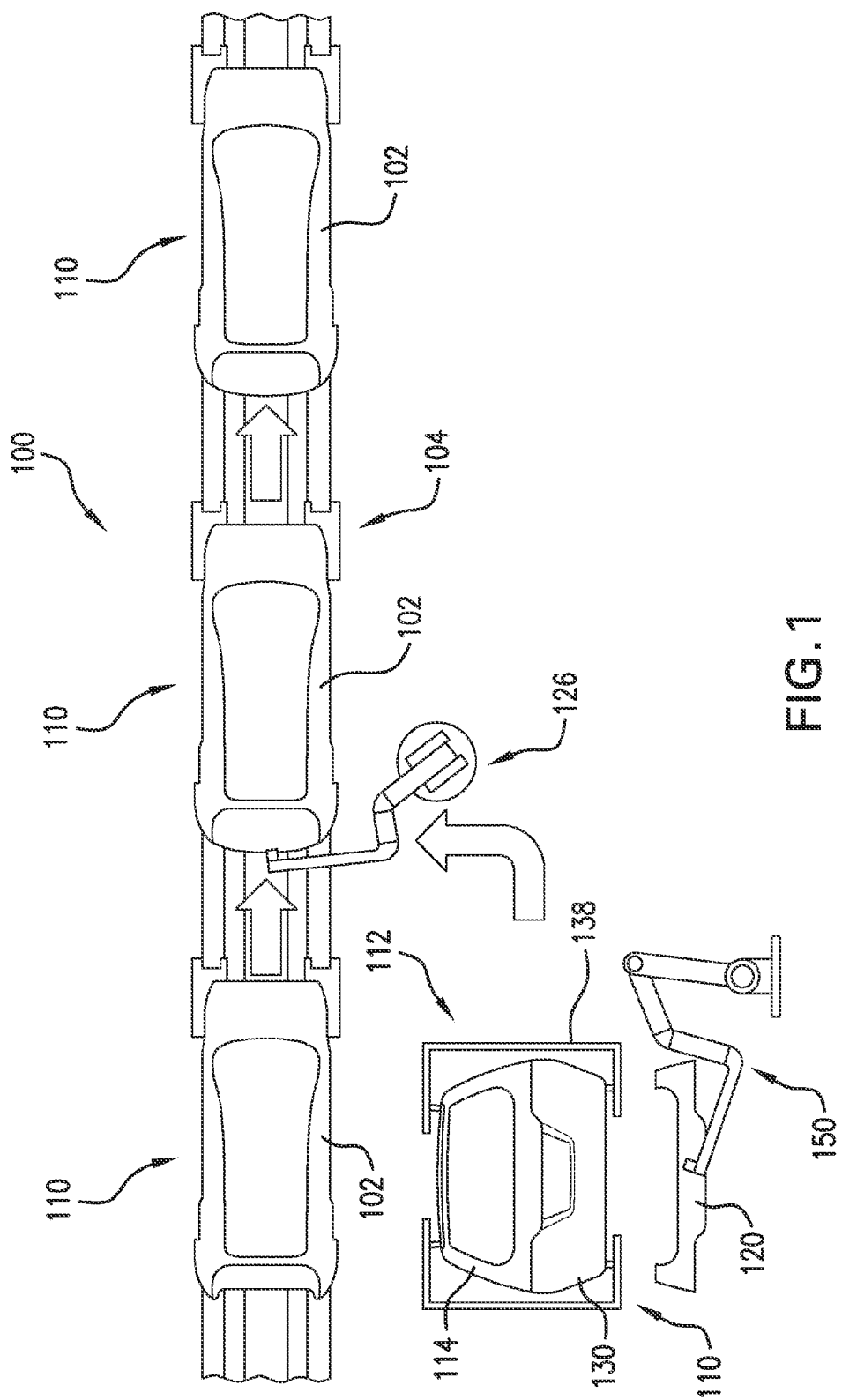
FIG. 1 is a schematic view of a portion of a vehicle body assembly line.

Referring now to the drawings, wherein like numerals refer to like parts throughout the several views, FIG. 1 schematically illustrates a system 100 for assembling a vehicle body 102 according to the present disclosure. The system 100 generally includes a vehicle body assembly line 104 having a plurality of work stations 110, including at least one welding station 112 for forming and welding structural components 114 (e.g., a trunk lid or tailgate, left and right side panels, and left and right quarter panels) to a vehicle frame (not shown) that define different portions of the vehicle body 102. The structural components 114 are formed of a first metal, such as a steel or steel-based alloy or an aluminum or aluminum-based alloy. As will be discussed in greater detail below, the welding station 112 is adapted to fixedly attach a garnish member 120 (e.g., a trunk lid or tailgate skin, a fender, a slide door rail cover, and a side panel extension) to a corresponding structural component 114. The garnish member 120 can be similar to the known plastic garnishes in that the garnish member 120 covers portions of the vehicle body 102 that do not meet styling or design requirements.

According to the present disclosure, however, the garnish member 120 is formed of a metal similar to that of the structural component 114, which allows for the welding of the garnish member 120 directly to the structural component 114. This allows the garnish member 120 to be configured as a second structural component adding strength and rigidity to the structural component 114 and, in turn, the vehicle body 102. According to one aspect, the garnish member 120 is entirely formed of the first metal; although, this is not required. It should be appreciated that once the garnish member 120 is properly fixed directly to the structural component 114, a robot-guided handling device 126 can releasably engage the structural component 114 with the garnish member 120 fixed thereto and set the structural component on the vehicle body 102 located on the assembly line 104. Once assembled, the vehicle body 102 can then be transferred to another work station downstream from the welding station 112.

Figure 2:
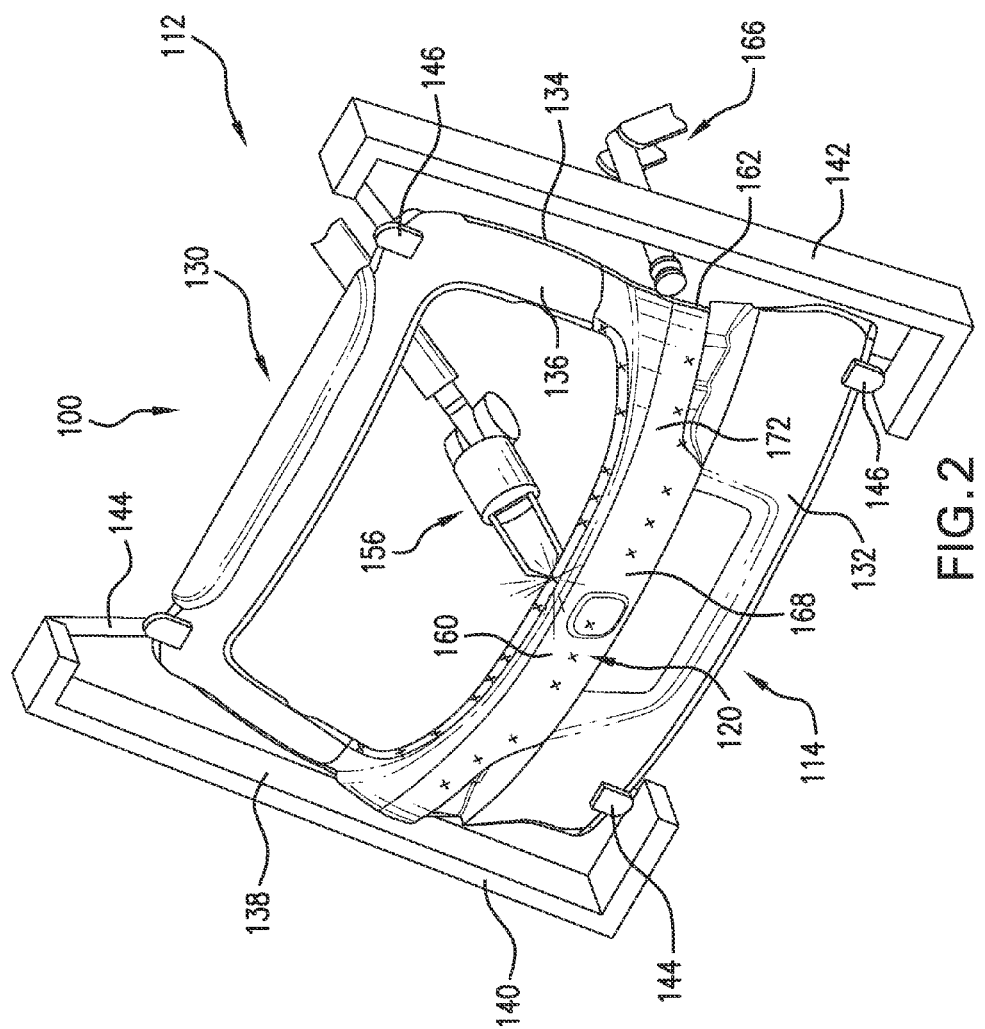
FIG. 2 is a schematic view of a garnish member being fixedly attached to a vehicle body structural component in a welding station of the vehicle body assembly line.

With reference to FIGS. 1 and 2, the structural component 114, shown as a trunk lid or tailgate 130, is positioned in the welding station 112. The tailgate 130 includes a body 132 having a peripheral edge portion 134. The body 132 is generally defined by an outer panel member 136 secured to an inner panel member (not shown) and, optionally, a reinforcement (not shown) interposed between the outer and inner panel members. For example, the outer panel member 136, inner panel member (not shown) and reinforcement (not shown) can have respective flange portions having complementary forms which nest and are welded together in the welding station 112. A fixture 138 located in the welding station 112 is adapted to receive and secure the assembled structural component 114 (i.e., tailgate 130). It should be appreciated that the configuration of the fixture 138 in the welding station 112 can be dependent on the structural component 114 being retained thereby. By way of example, with the depicted tailgate 130, the fixture 138 includes side support members 140, 142 located laterally outwardly of the peripheral edge portion 134 of the tailgate 130. Each side member 140, 142 can include a pair of respective clamp mechanisms 144, 146 which engage the peripheral edge portion 134. Once properly secured to the fixture 138, a second robot-guided handling device 150 provided at the welding station 112 releasably engages the garnish member 120 (e.g., a tailgate skin) and moves the garnish member 120 into position relative to the tailgate 130. It should be appreciated that the second robot-guided handling device 150 can be provided with at least one suction device for retaining the garnish member 120. This allows the second robot-guided handling device 150 to maintain the proper positioning of the garnish member 120 prior to attachment to the structural component 114. The fixture 138 can also be provided with additional clamp mechanisms (not shown) for temporarily connecting the garnish member 120 to the structural component 114.

As is shown in FIG. 2, with the structural component 114 and garnish member 120 being formed of similar metals, the garnish member 120 can be fixed to the structural component 114 in the same welding station 112 of a vehicle assembly line 102 as the assembly of the structural component 114. By way of example, at least one weld robot 156 located in the welding station 112 welds a first portion 160 of the garnish member 120 directly to the body 132 of structural component 114. According to one aspect, to further secure the garnish member 120 to the structural component 114, a second portion 162 of the garnish member 120 is hemmed to the peripheral edge portion 134 of the structural component 114 via a hemming robot 166 located in the welding station 112. When properly secured to the structural component 114, an outer surface 168 of a body 172 of the garnish member 120 defines an exterior surface of the structural component 114, and, in turn, an exterior surface of the vehicle body 102.

As indicated previously, and according to one aspect, the robot-guided handling device 126 sets the structural component 114 with the garnish member 120 fixed thereto on the vehicle body 102 located on the assembly line 104. The vehicle body 102 can then be transferred to a painting station 180 (FIG. 3) of the assembly line 104 downstream from the welding station 112. The painting station 180 is adapted to receive and simultaneously coat or paint the structural component 114 and the garnish member 120. By way of example, the painting station 180 can include a fixture 182 having a configuration similar to the fixture 138 provided in the welding station 112. The fixture 182 includes side support members 184, 186 having a pair of respective clamp mechanisms 188, 190 which engage the structural component 114 and the garnish member 120. A robot-guided painting device 200 provided at the painting station 180 simultaneously coats or paints the structural component 114 and the garnish member 120. However, as is well known in the art, it should be appreciated that the assembled vehicle body 102 (i.e., the vehicle body having each structural component 114 and its corresponding garnish member 120 secured thereto) can be transferred to a painting station of the assembly line adapted to coat or paint the assembled vehicle body 102. By having the garnish member 120 coated or painted simultaneously with the structural component 114, a uniform color for the vehicle body can be achieved.

Figure 3:
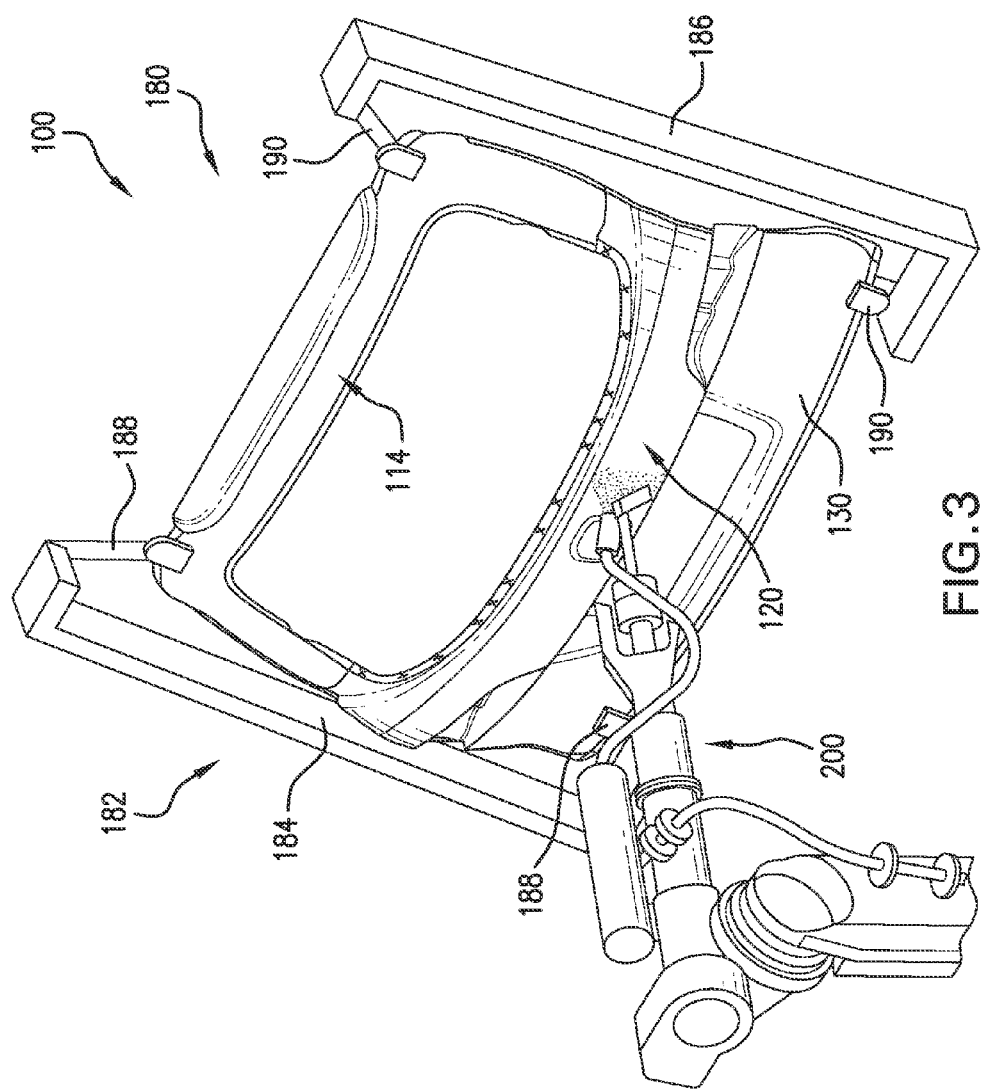
FIG. 3 is a schematic view of the vehicle body structural component with the garnish member fixed thereto being painted in a painting station of the vehicle body assembly line.
Figure 4:
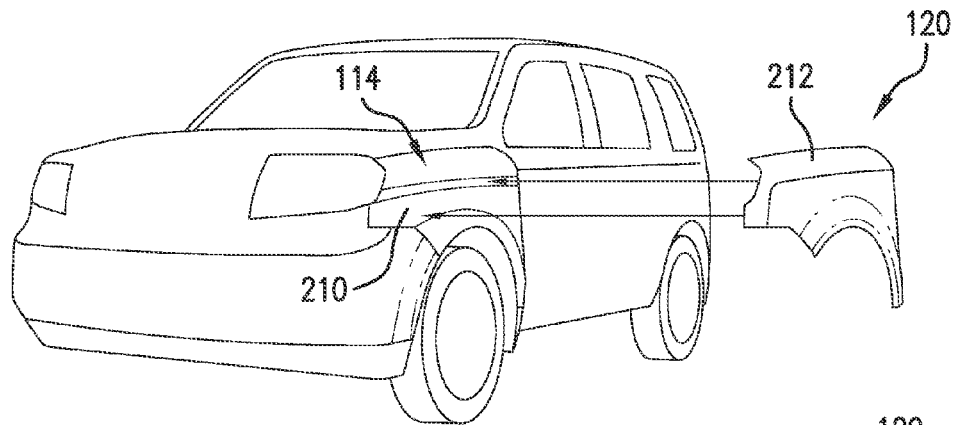
FIGS. 4, 5 and 6 are schematic views of alternative garnish members which can be fixed to vehicle body structural components in a common welding station of the vehicle body assembly line.
Figure 5:
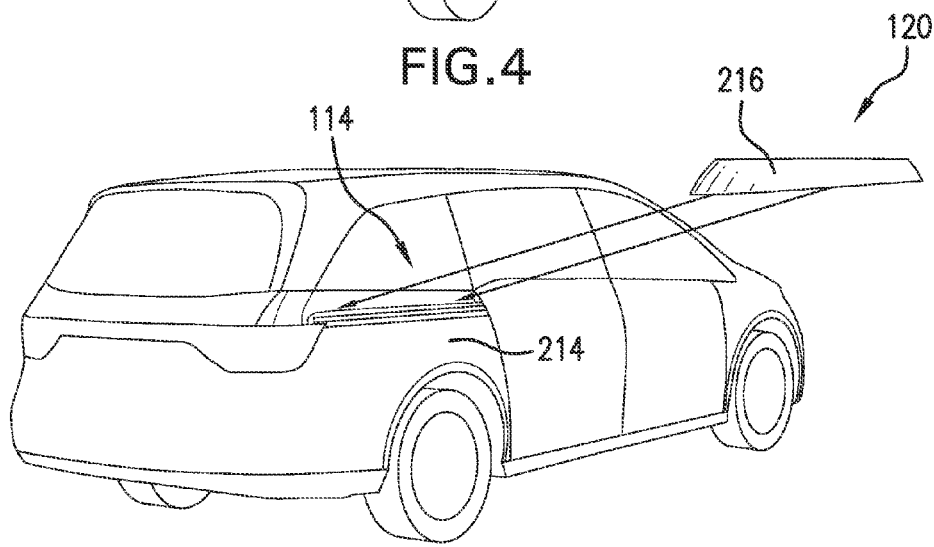
Figure 6:
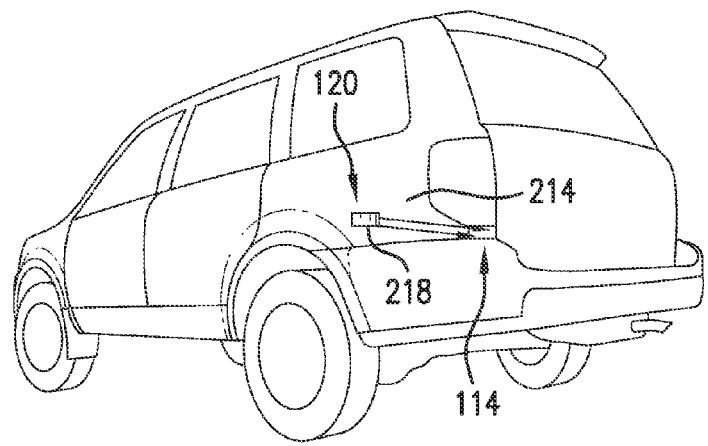

As is evident from the foregoing, the present disclosure provides a system 100 wherein a part 120 is welded and optionally hemmed to a structural component 114 of a vehicle body 102 in a common welding station 112 of the vehicle assembly line 104. This allows for the part to function as a garnish member 120, covering portions of the structural component 114 that can not be met by other parts due to formability or function. It should be appreciated that various structural components 114 and corresponding garnish members 120 are contemplated. For example, as shown in FIGS. 1-3, the structural component 114 can be a trunk lid or tailgate 130 and the garnish member 120 is a trunk lid skin. As shown in FIG. 4, the structural component 114 can be a quarter panel 210 and the garnish member 120 is a fender 212. As shown in FIGS. 5 and 6, the structural component 114 can be a side panel 214 and the garnish member 120 is one of a slide door rail cover 216 and a side panel extension 218.

As indicated previously, one benefit of the present disclosure is that the garnish member 120 can also be configured as a secondary structural component, adding strength and rigidity to the complete structural component assembly. The garnish member 120 will consistently maintain its location due on the structural component 114 to the garnish member being welded directly to the structural component 114. Another benefit provided by the exemplary system 100 is the provision of additional process time to allow for an increase in welding capacity for improved vehicle body rigidity. Welding the garnish member 120 allows for more time in assembly or final weld due to not having to assemble a separate garnish to the structural component as is common in vehicle body assembly. And the connection between the garnish member 120 and the structural component 114 is devoid of an associated fastener or an associated bracket thereby reducing the manpower needed to assemble the vehicle body 102. Further, when the part/garnish member 120 is to be color matched to the structural component 114, there is no difference in color that is found with known plastic garnishes. This construction will allow for a lower cost and more consistent appearance for the assembled structural component 114.

The present disclosure further provides a method of assembling a vehicle body 102 comprising assembling a vehicle body structural component 114 formed of a first metal in a vehicle assembly line 104; transferring the assembled structural component 114 to a welding station 112 of the vehicle assembly line; providing a garnish member 120 formed of the first metal, the garnish member 120 defines an exterior surface of the vehicle body 102, and transferring the garnish member 120 to the welding station 112; setting the garnish member 120 in position relative to the structural component 114 in the welding station 112; and welding the garnish member 120 directly to the structural component 114. The exemplary method further comprises separately hemming the garnish member 120 to the structural component 114. The exemplary method further comprises transferring the structural component 114 having the garnish member 120 welded thereto to a paining station 180 of the vehicle assembly line 104; and simultaneously painting the structural component 114 together with the garnish member 120 welded thereto.

While, for purposes of simplicity of explanation, the method has steps shown and described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle assembly comprising:
a structural component that defines a portion of a vehicle body, the structural component is formed of a first metal and includes an outer panel member secured to an inner panel member; and
a garnish member formed of the first metal and fixedly attached via welding or hemming directly to the outer panel member of the structural component in a same welding station of a vehicle assembly line as the assembly of the structural component, each of the outer panel member and the garnish member having an outer surface which defines an exterior surface of the vehicle body.

2. The vehicle assembly of claim 1, wherein the garnish member is entirely formed of the first metal.

3. The vehicle assembly of claim 1, wherein a first portion of the garnish member is welded to a body of the structural component.

4. The vehicle assembly of claim 3, wherein a second portion of the garnish member is hemmed to an edge portion of the structural component.

5. The vehicle assembly of claim 3, wherein the structural component is one of a trunk lid, a quarter panel, and a side panel.

6. The vehicle assembly of claim 5, wherein the garnish member is one of a trunk lid skin, a fender, a slide door rail cover, and a side panel extension.

7. The vehicle assembly of claim 1, further comprising paint covering the structural component and the outer surface of the garnish member fixedly attached thereto, wherein paint is simultaneously applied to the structural component and the garnish member in a painting station of the vehicle assembly line.

8. The vehicle assembly of claim 1, wherein the garnish member is fixedly attached to the structural component without the use of an associated fastener or an associated bracket.

9. The vehicle assembly of claim 1, wherein the garnish member is configured as a second structural component of the vehicle body.

10. A system for assembling a vehicle body comprising:
a vehicle assembly line having a plurality of stations including a welding station and a paint station located downstream of the welding station, the welding station is adapted to receive and weld an outer panel member to an inner panel member, the outer panel member and inner panel member together define a structural component of a vehicle body, the structural component is formed of a first metal, the same welding station is further adapted to receive a garnish member formed of the first metal and weld the garnish member directly to the outer panel of the structural component, the outer panel member together with the garnish member define an exterior surface of the vehicle body; and the painting station is adapted to receive and paint the structural component and the garnish member welded thereto.

11. The system of claim 10, wherein the structural component is a trunk lid and the garnish member is a trunk lid skin.

12. The system of claim 10, wherein the structural component is a quarter panel and the garnish member is a fender.

13. The system of claim 10, wherein the structural component is a side panel and the garnish member is one of a slide door rail cover and a side panel extension.

14. The system of claim 10, wherein the garnish member is hemmed to the structural component in the same welding station.

15. The system of claim 10, wherein the garnish member is configured as a second structural component of the vehicle body adding strength to the structural component, the connection between the garnish member and the structural component being devoid of an associated fastener or an associated bracket.

16. A method of assembling a vehicle body comprising:
providing an outer panel member and an inner panel member in a vehicle assembly line, the outer panel member and the inner panel member together defining a vehicle body structural component formed of a first metal;
transferring the outer panel member and the inner panel member of the structural component to a welding station of the vehicle assembly line;
assembling the structural component by welding the outer panel member to the inner panel member in the welding station
providing a garnish member formed of the first metal, the garnish member defines an exterior surface of the vehicle body, and transferring the garnish member to the welding station;
setting the garnish member in position relative to the assembled structural component in the welding station; and
welding the garnish member directly to the structural component in the welding station.

17. The method of claim 16, comprising:
transferring the structural component having the garnish member welded thereto to a paining station of the vehicle assembly line; and
simultaneously painting the structural component together with the garnish member welded thereto.

18. The method of claim 17, wherein prior to transferring to the painting station the garnish member is fixedly attached to the structural component without the use of an associated fastener or an associated bracket.

19. The method of claim 16, comprising separately hemming the garnish member to the structural component in the welding station.

20. The method of claim 16, comprising forming the garnish member entirely of the first metal.

* * * * *